March 24, 1953  F. DAVISON  2,632,487
PORTABLE TREE GIRDLING MACHINE
Filed Oct. 31, 1947
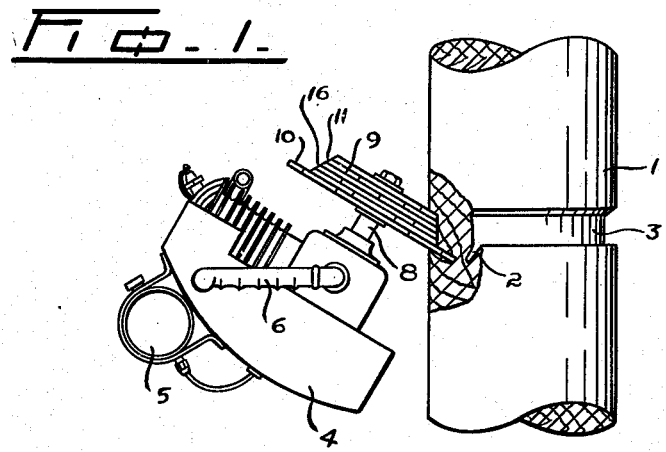
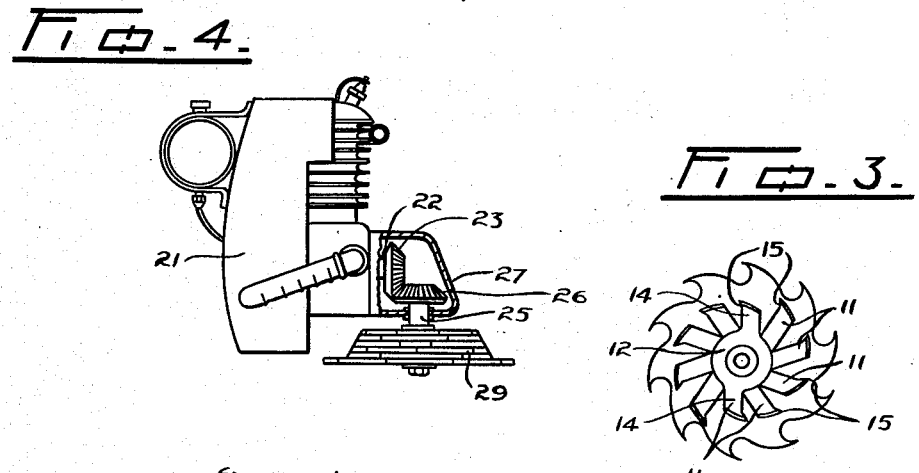
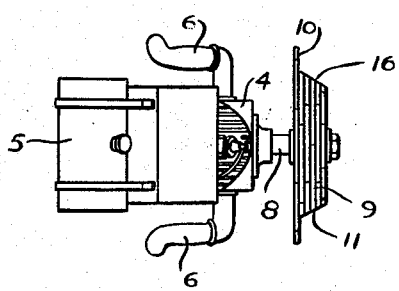
INVENTOR
FRANK DAVISON
ATTORNEY Patented Mar. 24, 1953

2,632,487

UNITED STATES PATENT OFFICE 2,632,487

PORTABLE TREE GIRDLING MACHINE

Frank Davison, Vancouver, British Columbia, Canada, assignor to Industrial Engineering Ltd., Vancouver, British Columbia, Canada Application October 31, 1947, Serial No. 783,283

1 Claim. (Cl. 144—133)

My invention relates to improvements in portable tree girdling machines.

There is in existence a process for removing bark from trees which consists in removing a ring of bark from each tree and making a cut into the wood at the bottom of the groove thus formed, after which a chemical-soaked bandage is wrapped around the tree in the groove. This process is described in U. S. Patent No. 2,324,968 issued to A. R. White. Until now, this cutting operation has been carried out by hand, thus making it impractical for large scale use. The main purpose of this invention is to provide a machine capable of simultaneously cutting the groove and making the cut in a practical manner. A machine capable of doing this work involves the use of a prime mover of substantial size, say one horsepower or more, and it must be of such light weight that it can be conveniently carried around the tree by a single worker. In order that the work may be done with the least expenditure of time, it is essential that the machine and its prime mover shall be a single self contained unit, without trailing electric cable, air hoses or other impedimenta which would necessitate the operator walking around the tree to girdle or ring it, and subsequently walking around said tree in the opposite direction to unwind the cable, hose or other trailing member, through which the motive force was supplied to the prime mover of the machine.

It is desirable that having regard to the nature of the terrain where the pulpwood trees are grown, that the total machine should not exceed thirty to forty pounds in weight, otherwise the operator will suffer undue fatigue and his daily output of trees girdled will be unduly low. It is also desirable that the cut through the sapwood should be inclined downwardly and inwardly of the tree so as to form a trough into which a chemical may be retained for the rapid destruction of the tree growth.

In brief, the essential requirements of a tree girdling machine are a single unit of light convenient weight, which will include cutting devices and a prime mover, and one which will be free from impedimenta of any kind which may hamper or delay the operator in his work.

The invention contemplates a closely coupled light weight internal combustion engine and a plurality of cutters adapted for ringing standing trees, as will be more fully described in the following specification and shown in the accompanying drawings, in which:

Fig. 1 is a side elevational view of the invention in position of use in tree girdling.

Fig. 2 is a plan view.

Fig. 3 is an end elevational view of the preferred form of cutter element.

Fig. 4 is a side elevational view of the invention showing a right angle drive between the engine and the cutter head.

In the drawings like characters of reference indicate corresponding parts in each figure.

The numeral 1 indicates a tree to be girdled by cutting a kerf 2 through the sap wood or the outer rings of the tree and removing a portion of the bark to expose a circumferential band of wood 3.

The numeral 4 indicates generally a portable gasoline engine having a gasoline tank 5 and such other equipment as to make a complete power unit and is provided with a pair of handles 6 by which the machine may be supported in convenient position for use. The engine crank shaft 8 is fitted with a cutter head 9 consisting of a circular saw 10 for cutting the kerf 2 and a plurality of cutter elements 11, each of which is provided with a central disc 12 and opposed arms 14, the outer ends of the arms 14 being swaged and ground to form cutting teeth or relatively wide chisel edges 15. The cutting elements 14 are made of varying diameters gradually decreasing from the saw 10 to the free end of the shaft 8, so that the total peripheral face 16 of the assembled cutter elements is frusto conical so that when in use in the position shown in Figure 1 the cut face of the band 3 with be substantially vertical. With the saw 10 inclined as shown, the kerf 2 will be inclined inwardly and downwardly as shown in Figure 1.

In the modification shown in Figure 4, the engine indicated by the numeral 21 is provided with a shaft 22 fitted with a mitre gear 23, which drives a vertical shaft 25 through a second mitre gear 26. The right angle drive above described is enclosed in a housing 27. A cutter head 29 is secured at the lower end of the driven shaft 25, the cutter head being similar to that above described.

In operation, the engine is started and the operator picks up the machine and presents the cutter head 9 to the tree at a suitable height above ground, thrusting the saw 10 into the wood until the cutting elements are also appropriately engaged, the operator walks once around the tree with the cutter head maintaining an appropriate depth of cut until said head reaches the starting point of the cut again, he then withdraws the machine and passes over to the next tree.

By referring to Figure 1, it will be seen that the cutting radius of the cutter next to the saw is considerably less than that of the saw, and that the cutters on the side of said cutter remote from the saw have cutting radii which are progressively smaller outwardly than that of said cutter. This arrangement permits the engine and shaft to be held at an angle to a tree while the required groove and cut are being formed therein, as clearly shown in Figure 1. When in this position, the machine cuts a groove of uniform depth around the tree while simultaneously making a deep cut through the sap wood at the lower edge of the groove, said cut slopping downwardly from the groove. The cutters remove only bark without touching the wood of the tree, thus reducing the amount of power required to drive the device. Furthermore, the angular setting of the engine and shaft, makes it possible to use a saw and cutters of much smaller diameter than would otherwise be possible. This further reduces the amount of power necessary and this is extremely important since the machine may be made small enough for a man to carry it without undue fatigue.

What I claim as my invention is:

A machine for preparing trees before they are cut down for the removal of bark therefrom by means of chemicals, consisting of an internal combustion engine, a driven shaft projecting outwardly from a side of the base of the engine, a circular saw mounted on the shaft adjacent the engine with its cutting edge approximately in line with the bottom of the engine, and a plurality of cutters mounted side by side on the shaft outside the saw, the cutter next to the saw having a cutting radius which is less than that of the saw, and the cutters on the side of the last-mentioned cutter remote from the saw having cutting radii progressively smaller outwardly than the latter, said arrangement of the cutter radii permitting the shaft and engine to be held at an angle to a tree while the required groove and cut are being formed therein.

FRANK DAVISON.

REFERENCES CITED

The following references are of record in the file of this patent:

UNITED STATES PATENTS

| Number | Name | Date |
|---|---|---|
| 318,596 | Buell | May 26, 1885 |
| 745,906 | Price | Dec. 1, 1903 |
| 797,428 | Hawkins | Aug. 15, 1905 |
| 807,647 | Weir | Dec. 19, 1905 |
| 1,461,376 | Bartlett | July 10, 1923 |
| 1,700,030 | Davey et al. | Jan. 22, 1929 |
| 1,862,681 | Johnson | June 14, 1932 |
| 1,883,392 | Moll | Oct. 18, 1932 |
| 1,937,073 | Stuve | Nov. 28, 1933 |
| 2,318,166 | Knight | May 4, 1943 |
| 2,324,968 | White | July 20, 1943 |

FOREIGN PATENTS

| Number | Country | Date |
|---|---|---|
| 124,643 | Great Britain | Apr. 3, 1919 |

OTHER REFERENCES

Texas Dept. of Agriculture Bulletin 95, published 1929, entitled "Pecan Growing in Texas," pages 102, 103, 104.